United States Patent [19]

Scheps

[11] Patent Number: 5,097,477
[45] Date of Patent: Mar. 17, 1992

[54] LASER DIODE PUMPED MULTIPLE ROD RING LASER ALLOWING COMBINATION OF MULTIPLE PUMP SOURCES

[75] Inventor: Richard Scheps, Del Mar, Calif.

[73] Assignee: The United States of America as represented by the Secretary of the Navy, Washington, D.C.

[21] Appl. No.: 696,819

[22] Filed: May 7, 1991

[51] Int. Cl.$^5$ .............................................. H01S 3/083
[52] U.S. Cl. ....................................... 372/94; 372/22; 372/75
[58] Field of Search ........................ 372/94, 70, 71, 75, 372/22

[56] References Cited

U.S. PATENT DOCUMENTS

| | | | |
|---|---|---|---|
| 3,479,620 | 11/1969 | Rigrod | 372/94 |
| 3,530,388 | 9/1970 | Guerra et al. | 372/94 |
| 3,771,031 | 11/1973 | Kay | 317/235 R |
| 4,664,523 | 5/1987 | Dorsman | 356/350 |
| 4,710,940 | 12/1987 | Sipes, Jr. | 372/75 |
| 4,785,459 | 11/1988 | Baer | 372/75 |
| 4,823,357 | 4/1989 | Casey | 372/92 |
| 4,829,537 | 5/1989 | Baer | 372/66 |
| 4,933,947 | 6/1990 | Anthon et al. | 372/94 |

*Primary Examiner*—James W. Davie
*Attorney, Agent, or Firm*—Harvey Fendelman; Thomas Glenn Keough

[57] ABSTRACT

A diode pumped ring laser allows for the combination of more pumping mode radiation from pumping laser diodes for pumping at least one gain element which is simultaneously end pumped in two longitudinal resonator axes that intersect in a focused waist at a bounce point. Each gain element and associated mirrors are disposed to direct a hemispherical shaped resonator mode to a focus (waist) in each gain element where the resonator mode is reflected from the waist and diverges away to thereby form two cone-shaped active volumes in each gain element. Locating and orienting pumping diodes to longitudinally end pump the resonator modes with their pumping radiation to have a nearly perfect overlap of the resonator mode throughout the length of the active volumes in each gain element assures a more efficient, higher power end pumping of the gain elements. Appropriately arranging gain elements and mirrors directs pumping mode radiation to enter an exterior face and leave through an interior face of each gain element. Resonator mode radiation enters and leaves through the interior face of each gain element at a large enough angle, such as the Brewster's angle, which, in addition to allowing the pumping of both active volumes within each gain element rod, also provides for a high degree of linear polarization of the resonant mode and promotes stable unidirectional operation of the ring laser.

18 Claims, 4 Drawing Sheets

HORIZONTAL SCALE IS 30 MHz/DIV

HORIZONTAL SCALE IS 50 ns/DIV

LASER DIODE PUMPED MULTIPLE ROD RING LASER ALLOWING COMBINATION OF MULTIPLE PUMP SOURCES

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATION

This application is related to a co-pending U.S. patent application #07/593,417 of Richard Scheps entitled "Multiple Element Ring Laser".

BACKGROUND OF THE INVENTION

Longitudinally pumped laser diode pumped lasers, generally, have relied on laser diode pump sources which generally are low power devices. As a consequence, the output power from a ring laser, or standing wave laser, has been limited by the power available from the pumping laser diodes. Combinations of more than one pumping laser sources have met with limited success since the problems associated with overpumping and alignment of more than one pumping source has unduly complicated the design and compromised efficiency.

Methods of obtaining higher power end-pumped lasers have involved combining laser diodes or combining gain elements such as that disclosed in the single gain-element ring laser entitled "A Single Frequency Nd:YAG Ring Laser Pumped by Laser Diodes" by Richard Scheps et al. which appears in *IEEE Journal of Quantum Electronics*, Vol. 26, No. 3, March 1990. This design uses two single-stripe one-watt laser diodes which form a single beam that is focused on the exterior face of a Nd:YAG rod. Single longitudinal mode performance for CW operation and single-transverse-multi-longitudinal-mode output performance for Q-switched operation were demonstrated in a combination of compact side and high efficiency. A design restraint on the use of this single gain-element ring laser is that its diode-pumped output power was limited by the available highest-power 11 laser diodes which were available for pumping. A typical recent attempt to combine laser diodes and gain-elements is set forth in the above reference co-pending application. However, this method fails to provide for a more maximum output, since it does not allow for the pumping of each of the gain elements along multiple paths.

Thus there is a continuing need in the state of the art for a diode pumping configuration for one or more gain elements in a ring laser having the capability for increased output power due to a more efficient optical pumping thereof.

SUMMARY OF THE INVENTION

The present invention is directed to providing an improved optically pumped ring laser having at least one gain element simultaneously end pumped in two longitudinal resonator axes that intersect in a focused waist that coincides with a bounce point in the gain element. At least one gain element is provided that has a dichroic surface reflective of resonator mode radiation and transmissive of pumping mode radiation and each gain element has the property to emit resonator mode radiation from more than one active volume therein as they are appropriately pumped A plurality of mirrors is disposed to reflect the resonator mode radiation in a resonator mode radiation path in the ring laser to a focus (waist) located at a bounce point at or near each dichroic surface in each gain element and to define the active volumes in each gain element. One of the plurality of mirrors is partially reflective to assure the higher output levels of resonator mode radiation A plurality of sources of pumping mode radiation each are aligned with the separate active volume to effect a longitudinal end pumping thereof and each of the plurality of sources of pumping mode radiation is provided with a means for focusing its pumping mode radiation on a separate focus (waist) at the bounce point for matching its focused pumping mode radiation with resonator mode radiation in separate active volume to thereby increase the efficiency of the emission of resonator mode radiation therefrom to provide for the higher output levels of resonator mode radiation.

An object of the invention is to provide a ring laser with an improved power output.

Another object of the invention is to provide a single frequency output ring laser having at least one gain element end-pumped simultaneously along two longitudinal resonator axes that intersect in a focused waist at a bounce point.

Another object of the invention is to provide a ring laser having at least one gain element simultaneously end-pumped along two intersecting axes to prevent the thermal effects otherwise associated with multiple pump sources while providing high efficiency.

Another object is to provide a diode pumped ring laser having at least one gain element defining a foneously end pumped along two intersecting axes to demonstrate CW and Q-switched operation for the fundamental and second harmonic.

Another object is to provide a diode pumped ring laser having at least one gain element defining -a focused waist at a bounce point where it is simultaneously end pumped along two intersecting axes to provide significant advantages in terms of alignment, stability and scalability.

These and other objects of the invention will become more readily apparent from the ensuing specification and drawings when taken in conjunction with the appended claims.

DESCRIPTION OF THE PREFERRED EMBODIMENT

Referring generally to the drawings, the ring lasers shown are scalable single frequency configurations that are capable of exhibiting greater power levels without the consequences normally associated with contemporary designs, such as overheating and lack of stability. In the context of this inventive concept, the term ring laser is intended to refer to a laser in which the resonant mode radiation is a traveling wave instead of a standing wave. The diode pumped single-frequency ring lasers to be herein described in detail are compact and efficient devices for applications requiring narrow bandwidth or single frequency sources.

Figure 1:
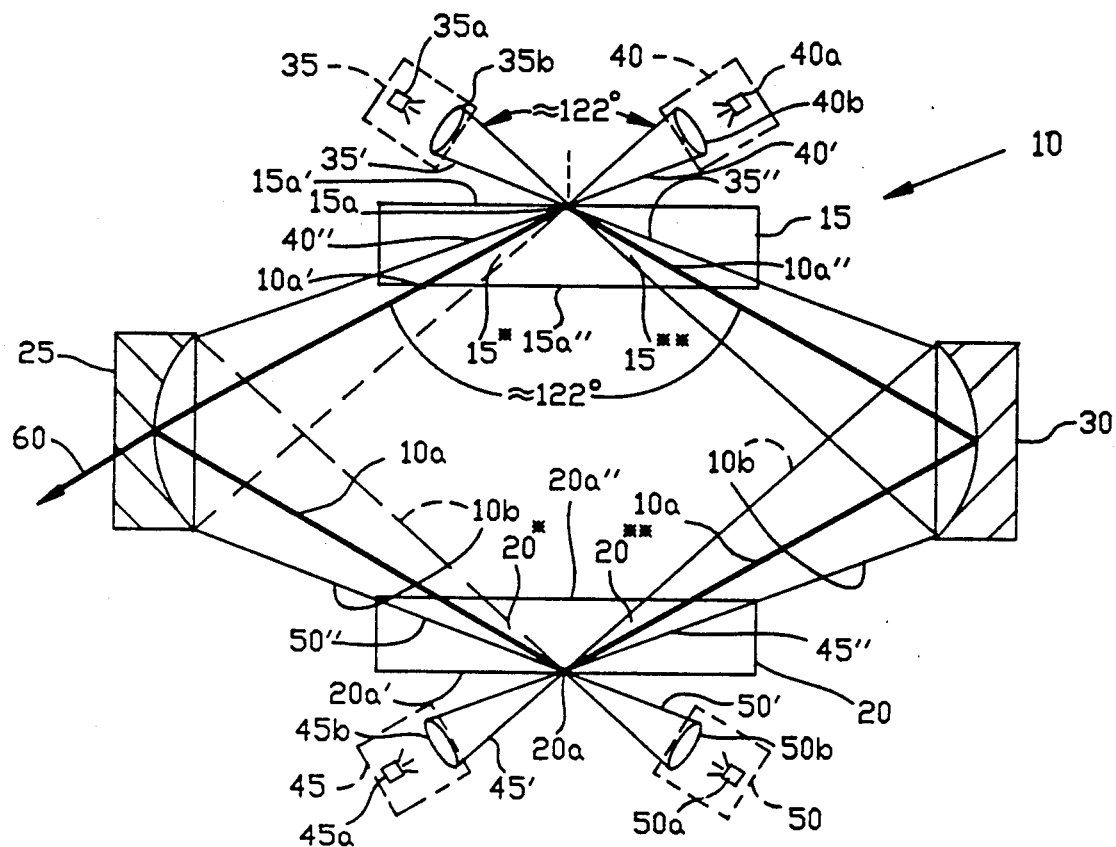
FIG. 1 is a schematic representation of one embodiment of the diode pumped ring laser having multiple gain elements that are each simultaneously end pumped in two longitudinal resonant axes that intersect in a focused waist at a bounce point.

As depicted in FIG. 1, ring laser 10 is provided with two gain elements 15 and 20 and a pair of suitably disposed radius of curvature mirrors 25 and 30 to define a resonator mode axis 10a of resonator mode radiation 10b. Each of the gain elements could be a Nd:YAG rod or some other selectable, suitable gain element material in the solid-state, liquid-state or gaseous-state form that are freely available in the state of the art.

The resonator mode radiation is created in substantially cone-shaped active volumes 15* and 15** and 20* and 20** of each gain element 15 and 20 where stimulated emission of radiation is effected. The dimensions of the resonator mode radiation and of the cone-shaped active volumes are determined, largely, by the dimensions and radii of curvature of the mirrors in the ring laser. Either one of concave radius of curvature mirrors 25 or 30 is at least partially reflective to function as an output coupler of output resonator mode radiation 60.

This ring laser configuration provides for increased output levels due to the novel end-pumping of the two gain elements by inclusion of the plurality of pumping sources 35, 40, 45 and 50. This novel end pumping arrangement not only does not interfere with the proper orientation and spacing of the gain elements and the mirrors to function as a ring laser, but also allows a simultaneous longitudinal end-pumping of each of the gain elements in two intersecting resonator axes 10a' and 10a" of resonator mode radiation 10b by appropriately aligned and focused diode or diodes or other suitable CW or pulsed pump sources 35, 40, 45 or 50.

Figure 1A:
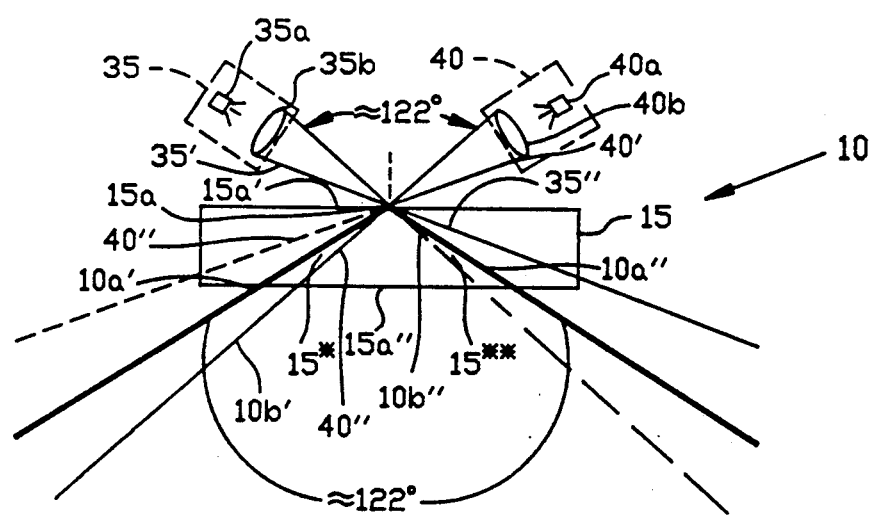
FIG. 1a an exact overlap or coincidence of the pumping mode radiation with the resonant mode radiation during a simultaneous longitudinal end-pumping of a gain element in two intersecting resonant mode axes that intersect in a focused waist at a bounce point by pumping mode radiation from two pumping mode radiation sources (the refractions of the beams in the gain element are not shown).

Noting FIG. 1a along with FIG. 1, each of the pumped sources has one or two laser diodes 35a, 40a, 45a or 50a forming a single beam that is focused by a lens 35b, 40b, 45b or 50b into a pumping mode radiation 35', 40', 45' or 50' that is focused at a waist 15a or waist 20a at a bounce point at or near a back surface or face 15a' or 20a' of gain-element rods 15 and 20, respectively. The back surfaces or faces 15a' or 20a' of the gain element rods each are provided with a dichroic coating which is highly transmissive at the appropriate angle to laser diode pumping radiation 35', 40', 45' or 50' (800 nm radiation, for example) yet highly reflective at the appropriate angle to resonant mode radiation (1.06 $\mu$, for example) to provide the bounce point for the resonator mode radiation. This arrangement provides for the reflection (or bounce) of the resonator mode radiation from the waists 15a and 20a (bounce points) into the cone-shaped active volumes 15* and 15** and 20* and 20** of each gain element 15 and 20 where stimulated emission of radiation is effected. The inside face 15a" and 20a" may be coated with an anti-reflective coating for the 1.06 $\mu$ resonator mode radiation. When the exterior angle that the resonator axis makes with the inside face is Brewster's angle, no coatings are used on this face, and polarization of the resonator mode radiation is enhanced (which is important for stability)

The focusing of the pumping mode radiation of the individual pump sources 35, 40, 45 or 50 is tailored so that pumping mode radiation 35', 40', 45' or 50' is focused at waist 15a or 20a and forms diverging pumping mode radiation 35", 40", 45" or 50" from waist 15a or 20a which exactly matches or exactly coincides with the resonator radiation of each cone-shaped active volumes 15* and 15** and 20* and 20** in each rod 15 or 20. This exact matching or coincidence of the pumping mode radiation and the resonant mode radiation from the bounce points in the gain elements effects a more efficient pumping energy conversion. In other words, because the diverging pumping mode radiation and the resonant mode radiation each are focused at a common waist (bounce point for the resonator mode radiation) and exactly match or exactly coincide with each other in the gain elements, the longitudinal end pumping of the resonant mode in the intersecting axes creates a greatly increased energy transfer.

Referring once again to FIG. 1a, the depiction of gain element 15 shows the exact overlap or coincidence of the resonant mode radiation 10b' and 10b" and the pumping mode radiations 35" and 40" in cone-shaped active volumes 15* and 15** of the gain element. This exact overlap or coincidence increases the efficiency of the pumping energy transfer to enhance the magnitude of the resonant mode radiation. It will be noted that the longitudinal axes of both of the resonant mode radiations where they emanate from the reflection or bounce point at waist 15a has their intersecting longitudinal axes aligned with the coincident pumping mode radiations. By being so oriented, the energy transfer is maximized from the pumping mode to the resonance mode.

Since the stimulated emission occurs within the resonance mode (the essentially cone-shaped active volumes 15* and 15** of the gain element within which the stimulated emission occurs) there is no dissipated pump energy, spontaneous emission or florescence outside of the resonance mode cone of gain element material so that this energy is more efficiently converted to the resonance mode. Thus, the longitudinal end-pumping of the resonance mode by the pumping is efficient to increase the overall efficiency of the ring laser.

The pump sources are selected to emit pumping mode radiation at a wavelength different than the resonator mode radiation of laser 10 so that the added pump sources can and do effect an increased power output of the ring laser. This inventive concept advantageously exploits the realization that the laser light of the resonator mode is not absorbed and is transmitted through each of the gain elements of the ring laser while the gain of each of the gain elements of the laser is a function of the magnitude of the optical pumping radiation provided by the number of pump sources. The two gain elements individually are end pumped in the active volumes in the gain elements by separate pump sources in intersecting 10a' and 10a" of the resonant mode, simultaneously, up to the maximum tolerable level of each gain element so that their aggregate resonant mode outputs are added to create a still greater total laser output power. As a consequence, this configuration avoids the limitations to scaling which otherwise have confronted designers who have attempted to increase the output of, for example, a single gain-element ring laser, since the resulting single gain-element ring laser had heat limitations which became apparent when they were over-pumped with too much optical pump power.

The novel orientation and arrangement of the gain elements and their associated mirrors in the ring laser configuration allows for the simultaneous end pumping of the separate gain elements in intersecting axes in a focus (waist) at or near the bounce point of the exterior face of each gain element. The resonator mode path 10a of resonator mode radiation 10b in laser 10 traverses both gain elements and the mirrors. The resonator mode radiation diverges to the dimensions of mirrors 25 and 30 which reflects the resonator mode radiation to a focus (waist) 15a and 20a (bounce point) at or near an exterior face 15a' or 20a' of each of the gain elements 15 and 20, respectively. This assures that the pattern of resonator mode radiation is such as to maximize overlap with the pumping mode radiation in the gain elements and at the waists to thereby provide optimum efficiency and power output 60.

The angle between the path of the pumping mode radiation 35' and the path of pumping mode radiation 40' as well as the angle between the path of pumping mode radiation 45' and the path of pumping mode radiation 50, is a wide angle that optimally, is equal to twice the Brewster's angle $\Theta$, or roughly two times 61° or about 122°, to the normal of surface 15a'or 20a' of gain element 15a or gain element 20. This particular orientation of the pumping mode radiation is selected to assure that a unidirectional resonant mode of single frequency is created in laser 10.

When Brewster's angle $\Theta$ for impinging pumping mode radiation has been selected, it may not be considered to be necessary to provide the anti-reflective coating on surface 15a", or surface 20a" of gain element 15 and gain element 20, respectively. Other angles may be selected which are sufficiently broad to accommodate the pumping sources; however, orientation of the pumping sources to each define an angle from the normal equal to $\Theta$ improves the polarization ratio of the resonator radiation and helps provide stable unidirectional resonance mode travel at the single frequency in laser 10. This has still a further advantage of having relatively no losses in the unidirectional mode since polarization in the plane of the ring is roughly about 450:1 (horizontal with respect to vertical). Selection of the Brewster angle provides the designer with the feature of selectivity in the polarization in the resonance mode radiation.

As mentioned before, mirrors 25 and 30 are appropriately oriented to direct the resonator mode radiation with respect to the waists in the two gain elements to thereby assure that the pattern of radiation is such as to maximize overlap with the pumping mode radiations in the active volumes in the gain elements. In the embodiment of FIG. 1, mirror 25 has been selected to function as the output coupler and mirror 30 is highly reflective. This arrangement could be reversed or any exterior facets of either the gain elements or the mirrors can be the output couplers as desired for an intended application. Furthermore, although the mirrors' surfaces are disclosed as being curved, the bases of the mirrors, as well as the faces 15a' and 20a' and interior faces 15a" and 20a" of the laser gain elements 15 and 20 can be flat or curved, coated or not coated, as a particular application calls for and suitable lenses might also be included as needed. The transmissive output percentage of the coupler surface can be varied or can be a complete reflection for one or both of the mirrors or gain elements in accordance with the desired operational characteristics.

Since precise alignment is called for, particularly with respect to the creation and maintenance of the Brewster angle $\Theta$, the mirrors and gain elements will also include suitable directional imparting or aligning devices to assure fine angular and frequency tuning. A commercially available piezoelectric mirror mount could be provided or other arrangements well-known to those versed in the relevant art could be selected. Suitable coatings for the mirrors, gain elements and other elements not elaborated on could be provided in accordance with well-known expedience in the art. Other output coupling techniques could be selected, and the output coupling percentages can be varied. The coatings and the mirrors as well as the interior and exterior faces of the gain elements are selectable as a matter of routine choice by one skilled in the art to provide the desired operational characteristics. The selected gain element coating may be applied on the exterior and/or interior exposed surfaces if desired.

Typically, the interior surfaces 15a" and 20a" may be uncoated and the typical coating on the exterior surfaces 15' and 20' could be a dichroic coating that is highly reflective at 1.06 $\mu$ and highly transmissive at 808 nm at the appropriate angles of incidence, although this coating also could be selected to have another response as needed, for example. Numerous commercial suppliers have available a wide variety of selectable coatings to accomplish the task at hand. The alignment of the pumping sources to the resonant mode effects a longitudinal end-pumping of the gain elements simultaneously along two intersecting axes which intersect at the each gain element. This provides for increased laser output in a compact package and, when configured as disclosed above, creates a unidirectional resonant mode radiation at a single frequency.

Figure 2:
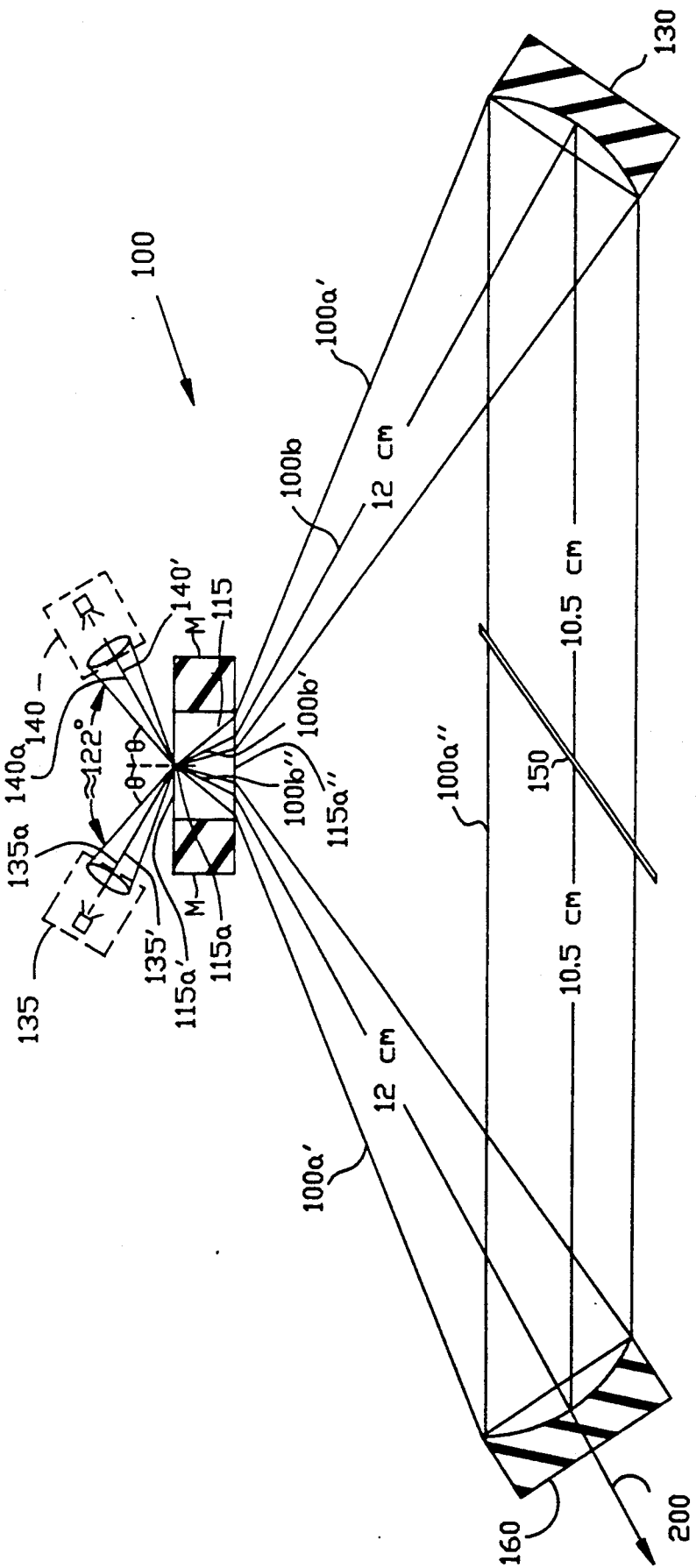
FIG. 2 is a schematic representation of another embodiment showing a triangular ring laser configuration having a single gain element simultaneously end pumped in two longitudinal resonant axes that intersect in a focused waist at a bounce point, (the refractions of the beams in the gain element are shown). The rod-shaped gain element is contained in a 1 inch diameter neodymium-iron-boron magnet for Faraday rotation and unidirectional operation is represented for the case where optical propagation proceeds counterclockwise. The components shown provide a collimated mode between the two 25 cm ROC mirrors.

Referring now to FIG. 2, more stable unidirectional operation is provided for in ring laser 100, otherwise referred to as a collimated ring laser. A single gain element 115, in this case a 6.25 mm diameter 5 mm long Nd:YAG rod 115 in a high field neodymium-iron-boron magnet m (although, cobalt samarium or other high field magnets are suitable), has a pair of appropriately oriented pumping sources 135 and 140 properly focusing their pumping mode radiation 135' and 140' at waist 115a of the gain element. Ring laser 100 also is provided with two 25 cm radius of curvature mirrors 130 and 160 separated one from another by 21 cm so that resonator mode radiation 100a' is collimated 100a'' between mirrors 130 and 160 and comes to a focus (waist) 115a at or near exterior face 115a of laser rod 115. Magnet m provides a nonreciprocal Faraday rotation in the crystal for the linearly polarized resonator beam, and a single plate birefringent tuning element 150, which may be positioned at Brewster's angle with respect to the resonator mode axis, provides reciprocal polarization rotation. The angles of incidence at the curved mirrors are 14.4° and the external angle at the interior face 115a'' of the gain element is equal to Brewster's angle $\Theta$. Interior face 115a'' is uncoated and exterior face 115a' is dichroic coated for high reflectivity at 1.06 $\mu$ and high transmission at 808 nm at the appropriate angles of incidence. The birefringent plate 150 was used to rotate the polarization for minimum loss in one propagation direction only. For this purpose an anti-reflection coating half wave plate at normal instance was found to perform equally well as the birefringent plate.

Figure 3:
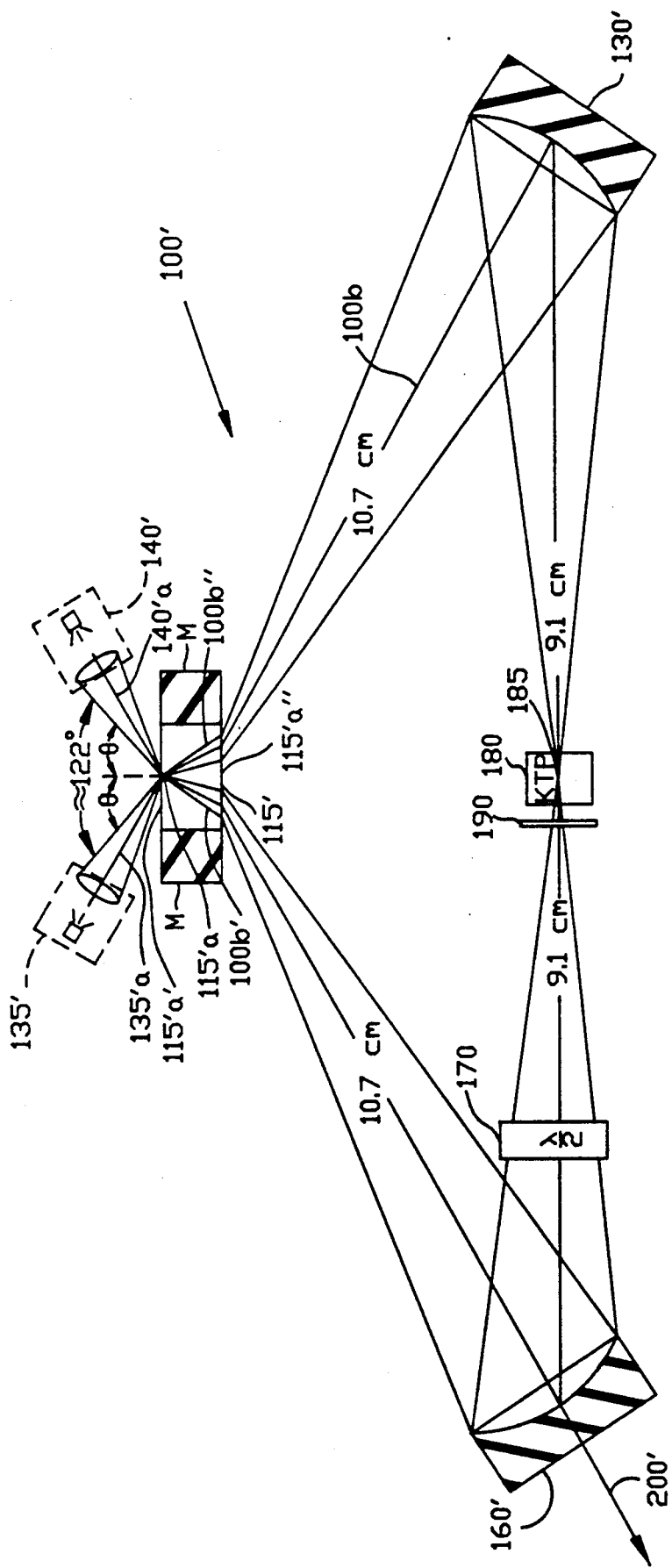
FIG. 3 is a schematic representation of another embodiment showing a triangular ring laser configuration having a single gain element simultaneously end pumped in two longitudinal resonant axes that intersect in a focused waist at a bounce point, (the refractions of the beams in the gain element are shown). The rod-shaped gain element is contained in a 1 inch diameter neodymium-iron-boron magnet for Faraday rotation and unidirectional operation is represented for the case where optical propagation proceeds counterclockwise. The components are designed to produce a second waist between the two 10 cm ROC mirrors. The KTP crystal and chopper were used for second harmonic generation and Q-switched operation.

Another embodiment depicted in FIG. 3 has a focused ring laser 100' designed to provide for additional intracavity focus between two mirrors 130' and 160'. To achieve this, the 25 cm radius-of-curvature mirrors of the embodiment of FIG. 2 were replaced with 10 cm radius-of-curvature mirrors 130' and 160' and the spacing was adjusted to 10.7 cm and 18.2 cm for the mirror-to-rod and mirror-to-mirror distances, respectively. A half wave plate 170 provided reciprocal polarization rotation and for intracavity second harmonic generation, a 5 mm long KTP crystal 180 was placed at cavity waist 185. For repetitive Q-switched operation, a mechanical chopper 190 was located 2 mm in front of the focus (waist), (although, other means of obtaining repetitive Q-switched operation, such as an acousto-optic or electro-optic Q-switch could also be used).

As noted in the discussion above, for best efficiency the pump axis 135'a and 140'a (pumping mode radiation) from pumping mode radiation sources 135' and 140' must coincide with the axes of the resonator mode envelopes 100b' and 100b'' (resonator mode radiation) within rod-shaped gain element 115' so that the pumping mode radiation and the resonator mode radiation exactly overlap and exactly coincide. The external angle between the two pumped axes is twice Brewster's angle $\Theta$, or about 122.43°, so that it is possible to pump along both intersecting resonator mode axes of resonator mode envelopes 100b' and 100b'' (resonator mode radiation), simultaneously. This simultaneous pumping permits scaling of the pump power beyond that available along merely pumping along a single axis. For one pump axis 135'a single stripe laser diodes were used while for the second axis 140'a the pump consisted of either a single-stripe 3-watt diode or a Ti:sapphire laser operating at 808 nm. Because of the mirror and lens mount dimensions, the shortest focal length focusing lens was 25 mm. As the pump axis is not normal to the rod axis, the focused pump waist is elliptical. This factor, in conjunction with the 25 mm lens, produced a lower-than-optimum pump power density, affecting the pump threshold power. Either mirror 130, 160 or 130' or 160' of FIGS. 2 and 3 could be used for the output coupler of output resonator mode radiation 200 or 200'.

FIG. 2 shows the preferred (counterclockwise) direction of beam propagation within ring-shaped laser 100, and indicates that mirror 160, typically, was used as the output coupler. The preference in propagation direction was based on alignment considerations. By rotating the birefringent or half wave plate 150 about the axis normal to its surface, either propagation direction could be selected.

Figure 4:
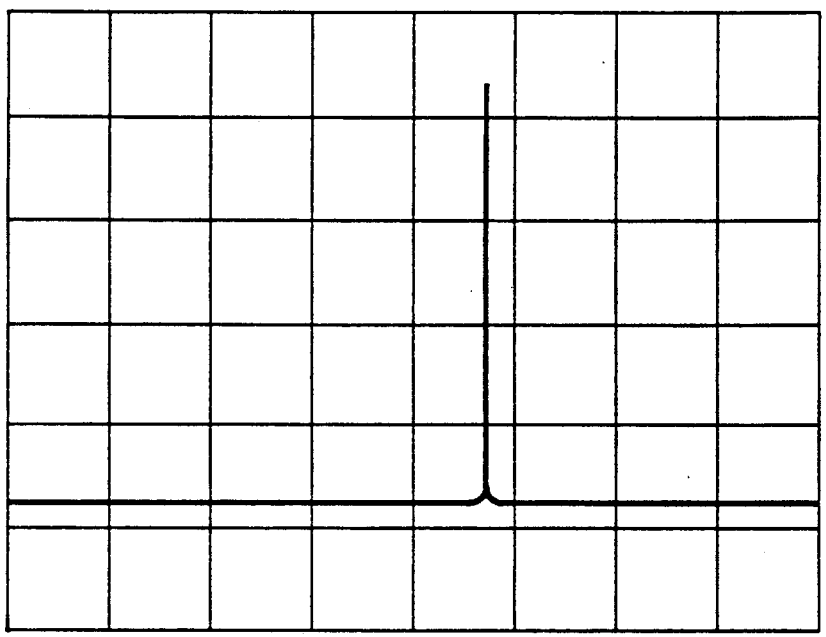
FIG. 4 shows a scanning Fabry-Perot analysis of the collimated ring output of the embodiment of FIG. 2 at 304 mW, (1.5 MHz linewidth is resolution limited; horizontal scale is 30 MHz div).

For the collimated ring laser of FIG. 2 the output beam divergence of the resonator mode radiation 100a' depends on the propagation direction since the mode is hemispherical (or could be referred to as cone-shaped) between the gain element rod and each mirror, but resonator mode radiation 100a'' is collimated between the two mirrors. The collimated ring provided stable, single frequency operation at the Nd:YAG fundamental. The presence of three Brewster surfaces in the ring (at surface 115a'' and both surfaces of plate 150) produced a high degree of linear output polarization. The polarization ratio was found to be 400:1, substantially better than an earlier design. The high polarization ratio contributed to the stability of unidirectional operation by increasing the losses for clockwise rotation. The highest output power 200 was obtained with a 97% R output coupler in place of mirror 160. Pumping mode source 135 pumping along a single pump axis 135a with an incident power of 1.54 W, 304 mW single mode output power was obtained. The optical conversion efficiency was 20% and the slope efficiency was 39%. A scanning confocal Fabry-Perot analysis of this output is shown in FIG. 4. The trace indicates that the linewidth measurement is resolution limited at 1.5 MHz. No drift in center frequency was observed within this resolution limit for a period of several hours.

Pumping mode source 140 pumping along the second axis 140a with an additional 2.25 W of power produced a total of 489 mW and an optical conversion efficiency of 13%. This lower conversion efficiency is due primarily to the larger focused pump waist 115a for the 3 W laser diode relative to the 1 W diodes used in pumping mode sources 135. This was verified by using a Ti:sapphire laser operating at 808 nm to pump along the second axis in place of the 3 W diode. The slope efficiency for the Ti:sapphire laser operating with 277 mW was 39%, while the overall optical conversion efficiency was 21%. Thermal loading effects at the power levels used in this work were not observed, as the two pump axes focus into separate active volumes. Chopping the pump beam had no effect on the output power.

Figure 5:
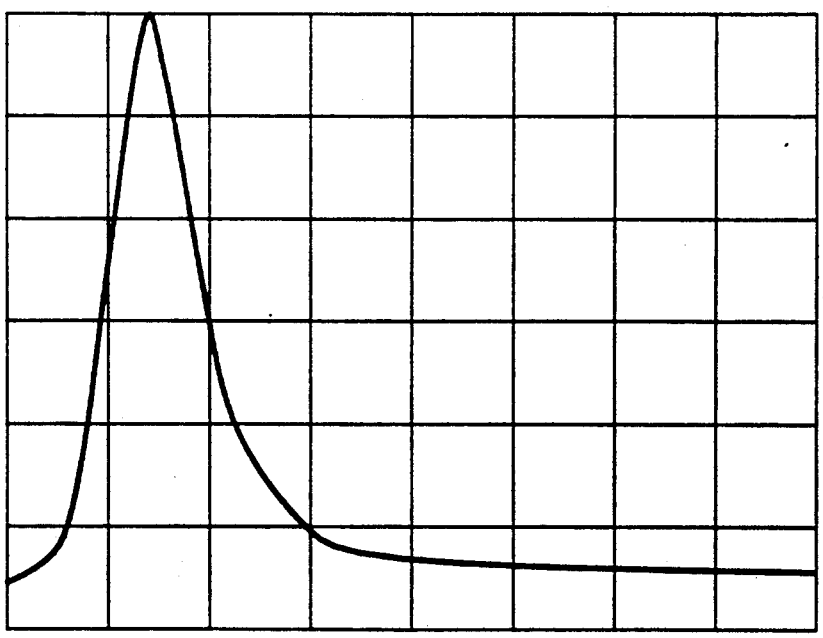
FIG. 5 is a Q-switched pulse shape at 1.06 $\mu$ for the focused ring of the embodiment of FIG. 3, (horizontal scale is 50 ns/div).

The focused ring 100' of FIG. 3 operated more efficiently than the collimated ring 100 of FIG. 2, but the collimated ring was more stable over long periods of time. The output polarization ratio of the focused ring was 190:1 owing to the absence of the two Brewster surfaces of birefringent plate 150 of the collimated ring 100 of FIG. 2. Using two 1 W laser diodes in pumping mode source 135', a maximum output power of 397 mW and an optical conversion efficiency of 26% were obtained with a 95% R output coupler for output resonator mode radiation 200'. The maximum slope efficiency, obtained with an 85% R output coupler, was 36%. Pumping mode source 140' pumping along the second pump mode axis 140''a with an additional 251 mW from a Ti:sapphire laser produced 493 mW single frequency at 1.06 µ. The slope efficiency for the Ti:sapphire laser was 42%. With mechanical chopper 190 placed near resonator waist 185, repetitive Q-switched operation was obtained. The maximum switching rate was 2.88 kHz, significantly below the approximately 20 kHz rate required for the Q-switched average power to approach the cw power. Consequently, the maximum average Q-switched power observed was 109 mW using a 90% output coupler. The pulse width was approximately 50 ns and is shown in FIG. 5. With the KTP crystal inserted at the second waist, as indicated in FIG. 3, and output coupler 160' replaced with a dichroic high reflector for 1.06 µ, 47 mW of 532 nm output was obtained. This represents a 43%second harmonic conversion efficiency. The amplitude stability of the green output was exceptional and although ring laser 100' operated unidirectionally when Q-switched, the output was multi-longitudinal, single transverse mode. A single mode second harmonic output power of 10 mW was obtained for cw operation.

The optical conversion efficiency obtained for both ring configurations 100 and 100' is similar to that observed for a monolithic ring laser, see T. J. Kane et al.'s "Frequency Stability and Offset Locking of a Laser-Diode-Pumped Nd:YAG Monolithic Nonplanar Ring Oscillator", *Opt. Lett* 12 175 (1987) but somewhat lower than the value of 34% reported previously, see R, Scheps et al.'s "Single Frequency Nd:YAG Ring Laser Pumped By Laser Diodes", *IEEE J. Quant.Electron.* 26, 413 (1990). This is due to the lower pump power density as mentioned above, and to the greater degree of astigmatism within the resonator. On the other hand, the slope efficiency for diode pumping is comparable to that previously observed, while the slope efficiency for Ti:sapphire laser pumping is slightly higher. The astigmatism in the present cavity arises from off-axis use of the mirrors and rod, but can be corrected with a tilted plate of appropriate thickness. The thickness of the birefringent plate used in the ring was 0.5 mm, too thin to compensate for the astigmatism.

Resonator components can be selected to develop substantially different mode configurations, providing optimum performance for a given application. Some of the unique features of the ring lasers disclosed herein are their high degree of polarization and the ability to pump the single gain element simultaneously from two different directions.

The gain element rod of the triangle-shaped ring laser can thus be readily scaled in terms of additional pump diodes with no loss in efficiency and still maintain its compact size. Two different configurations were demonstrated, a collimated and a focused version. The collimated ring is highly stable, while the focused ring is more efficient and provides high second harmonic conversion. Q-switched operation for the focused ring was demonstrated for the fundamental and second harmonic, producing pulse widths as short as 50 ns using a mechanical chopper at 2.88 kHz. The addition of a second gain element to the ring can further increase the number of diodes with which one can end pump, expanding the resonator to include four corner elements as is the case of the embodiment of FIG. 1. The mirror angles and spacings of the ring elements would be adjusted to allow the resonator mode to come to a focus at the exterior face of each rod.

The advantageous use of the aforedescribed Brewster angle orientations of the components apply to all the configurations of the ring lasers disclosed herein as would be apparent to one versed in the art. In addition, other ring laser arrangements and their inclusion of the teachings disclosed herein will suggest themselves to one skilled in the art to which this invention pertains.

Obviously, many other modifications and variations of the present invention are possible in light of the above teachings. It is therefore to be understood that within the scope of the claims the invention may be practiced otherwise than as specifically described.

What is claimed is:

1. A ring laser for emitting high output levels of resonator mode radiation comprising:
   at least one gain element having a dichroic surface reflective of said resonator mode radiation and transmissive of pumping mode radiation, each said gain element having the property to emit said resonator mode radiation from more than one active volume therein as they are appropriately pumped;
   a plurality of mirrors disposed to reflect said resonator mode radiation in a resonator mode radiation path in said ring laser to a focus (waist) located at a bounce point at or near each said dichroic surface in each said gain element and to define said active volumes in each said gain element, one of said plurality of mirrors being partially reflective to assure said higher output levels of resonator mode radiation; and
   a plurality of sources of said pumping mode radiation each being aligned with a separate said active volume to effect a longitudinal end pumping thereof and each of said plurality of sources of said pumping mode radiation being provided with a means for focusing its said pumping mode radiation on a separate said focus (waist) for matching its focused said pumping mode radiation with said resonator mode radiation in said separate said active volume to thereby increase the efficiency of the emission of said resonator mode radiation therefrom to provide for said high output levels of resonator mode radiation.

2. A ring laser according to claim 1 in which two of said sources of said pumping mode radiation are located with respect to said active volumes of each said gain element to assure their being simultaneously end pumped in two longitudinal resonator mode axes that intersect in said focus (waist) at said bounce point.

3. A ring laser according to claim 2 in which said resonant mode radiation defines an angle equal to about twice the Brewster's angle where said resonator mode radiation travels to and from said gain element and said two of said sources of said pumping mode radiation are positioned with respect to the normal of said dichroic surface to define an angle equal to about the Brewster's angle and are positioned with respect to each other to define an angle therebetween equal to about twice the Brewster's angle to assure unidirectional travel in said ring laser.

4. A ring laser according to claim 1, 2 or 3 in which there are two of said gain elements diagonally disposed with respect to each other in said ring laser and two of said mirrors diagonally disposed with respect to each other in said ring laser and interposed with respect to said gain elements 5. A ring laser according to claim 1, 2 or 3 in which one of said gain elements is disposed at the apex of a triangularly-shaped said ring laser and two of said mirrors are disposed with respect to each other in said ring laser to direct said resonator mode radiation to said focus (waist) in said gain element.

6. A ring laser according to claim 5 in which said mirrors have a radius of curvature to reflect collimated said resonator mode radiation therebetween.

7. A ring laser according to claim 6 further including:
a birefringent plate interposed between said mirrors and oriented at any angle with respect to a resonator mode axis of said resonator mode radiation to receive said collimated said resonator mode radiation and provide polarization rotation.

8. A ring laser according to claim 5 in which said mirrors have a radius of curvature to focus a waist of said resonator mode radiation therebetween.

9. A ring laser according to claim 8 further including:
a KTP crystal located at said waist of said resonator mode radiation between said mirrors to effect a second harmonic conversion.

10. A ring laser according to claim 8 further including:
means for interrupting radiation placed near said waist of said resonator mode radiation between said mirrors to effect a Q-switched operation.

11. A multiple gain-element ring laser according to claim 4 in which said plurality of said gain elements are solid-state materials.

12. A multiple gain-element ring laser according to claim 4 in which said plurality of said gain elements are liquid-state materials.

13. multiple gain-element ring laser according to claim 4 in which said plurality of said gain elements are gaseous-state materials.

14. A multiple gain-element ring laser according to claim 5 in which said plurality of said gain elements are solid-state materials.

15. A multiple gain-element ring laser according to claim 5 in which said plurality of said gain elements are liquid-state materials.

16. A multiple gain-element ring laser according to claim 5 in which said plurality of said gain elements are gaseous-state materials.

17. A multiple gain element ring laser according to claim 4 in which said higher resonator mode output levels is at a single frequency.

18. A multiple gain element ring laser according to claim 5 in which said higher resonator mode output levels is at a single frequency.

* * * * *